(12) United States Patent
Tanneberger et al.

(10) Patent No.: US 7,689,254 B2
(45) Date of Patent: Mar. 30, 2010

(54) MOTOR VEHICLE MOBILE PHONE CONFIGURATION AND COMMUNICATION METHOD

(75) Inventors: Volkmar Tanneberger, Meine (DE); Nikolai Reimer, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 803 days.

(21) Appl. No.: 11/294,092

(22) Filed: Dec. 5, 2005

(65) Prior Publication Data

US 2006/0148533 A1 Jul. 6, 2006

Related U.S. Application Data

(63) Continuation of application No. PCT/EP2004/005944, filed on Jun. 2, 2004.

(30) Foreign Application Priority Data

Jun. 4, 2003 (DE) ................................ 103 26 357

(51) Int. Cl.
*H04B 1/38* (2006.01)
*H04M 1/00* (2006.01)

(52) U.S. Cl. ................. 455/569.1; 455/569.2; 455/344; 455/345

(58) Field of Classification Search ................. 455/345, 455/344, 346, 569, 569.1, 569.2, 550.1, 556.1, 455/90.3, 99
See application file for complete search history.

(56) References Cited

U.S. PATENT DOCUMENTS

| 6,892,051 B2* | 5/2005 | Schmitt et al. ............. 455/41.2 |
| 2003/0003892 A1* | 1/2003 | Makinen ..................... 455/345 |
| 2004/0063471 A1* | 4/2004 | Kindo et al. ................ 455/566 |
| 2004/0242217 A1 | 12/2004 | Blickberndt et al. |

FOREIGN PATENT DOCUMENTS

| DE | 693 21 858 T2 | 9/1993 |
| DE | 100 12 057 | 9/2001 |
| DE | 101 00 824 | 11/2002 |
| DE | 101 47 896 A1 | 4/2003 |
| EP | 0 310 876 A2 | 4/1989 |
| EP | 0 559 187 A1 | 9/1993 |
| EP | 1 156 645 | 7/2001 |
| GB | 2 229 340 A | 9/1990 |
| WO | WO 98/57824 | 5/1998 |

* cited by examiner

*Primary Examiner*—Tuan A Pham

(57) ABSTRACT

A mobile radio configuration for a motor vehicle has a vehicle-mounted terminal that is firmly installed in the vehicle. The terminal has, or is connected to, a mobile radio module linked with an antenna and a Bluetooth module. The system further includes a radio terminal that is provided with a SIM and a Bluetooth module. A Bluetooth connection can be established between the vehicle-mounted terminal an the mobile radio terminal, via which connection the SIM data can be transferred into the firmly installed terminal which then logs onto the mobile radio network using the SIM data. The mobile radio terminal functions as a handset of the vehicle-mounted terminal and the useful data are exchanged via the Bluetooth modules.

6 Claims, 1 Drawing Sheet

MOTOR VEHICLE MOBILE PHONE CONFIGURATION AND COMMUNICATION METHOD

CROSS-REFERENCE TO RELATED APPLICATIONS

This is a continuation, under 35 U.S.C. § 120, of copending international application No. PCT/EP2004/005944, filed Jun. 2, 2004, which designated the United States; this application also claims the priority, under 35 U.S.C. § 119, of German patent application No. 103 26 357.8, filed Jun. 4, 2003; the prior applications are herewith incorporated by reference in their entirety.

BACKGROUND OF THE INVENTION

Field of the Invention

The invention relates to a motor-vehicle mobile phone configuration with a terminal that is permanently installed in a vehicle. The terminal comprises a mobile phone module which is connected to an antenna and a short-range radio (Bluetooth) module, and a mobile phone terminal having an identification module (SIM, subscriber identification module) and a short-range radio (Bluetooth) module. It is possible to set up between the permanently installed terminal and the mobile phone terminal a Bluetooth connection via which the SIM data can be transmitted to the permanently installed terminal that signs on in the mobile phone network using the SIM data. The invention also pertains to a method for mobile phone communication and a mobile phone terminal which is suitable for the purpose.

German published patent application DE 101 00 824 A1 discloses a motor-vehicle mobile phone configuration which comprises a mobile phone terminal wherein an identification module is located. The identification module may be a plug-in SIM (Subscriber Identity Module), for example. The term SIM will be used herein, generally, to describe the identification module. Furthermore, the mobile phone terminal has a standardized short range radio interface, referred to below generally as a Bluetooth interface. Furthermore, a permanently installed terminal, which is preferably embodied as a hands-free device, is located in the motor vehicle, said hands-free device being composed of a user interface with a microphone and a loudspeaker, a Bluetooth module connected thereto and a mobile phone module with an antenna. The mobile phone module is preferably embodied as a GSM module. In preparation, the hands-free device is registered with the network operator for the mobile phone network using the SIM. In order to sign on the hands-free device, the mobile phone device with connected SIM must be within the range of the Bluetooth interfaces so that a Bluetooth connection can be set up which remains over the entire time while the hands-free device is signed on to the mobile phone network.

At the start, i.e. before the hands-free system is signed on to the network, the mobile phone subscriber number of the user and the ciphering parameters which are required to sign on to the mobile phone network are transmitted by the identify module (e.g., SIM). The transfer of the data from the SIM in the mobile phone device and the signing on of the hands-free system is brought about by the user, for example using the user interface of the hands-free system as soon as the short-range radio connection (e.g., Bluetooth) is set up.

However, before authorization data is transmitted from the SIM to the hands-free device, various levels of security, which are already implemented in the Bluetooth standard, are run through. These include authentication of the two devices with respect to one another and inputting PIN codes. Furthermore, the data transmitted on the Bluetooth interfaces must be ciphered. This function is also already implemented in the Bluetooth standard.

After the authorization data of the SIM has been transferred to the hands-free device, the mobile phone device is automatically signed off—if it is signed on to the mobile phone network at this time—and switches over into the energy saving mode.

Furthermore, further data such as, for example, the phone book of the SIM which the user has personally stored for himself there can be transferred so that this phone book is also available within the hands-free device.

The data which is transmitted from the SIM is not permanently stored in the hands-free device. As soon as the hands-free device is signed off again, all the SIM-specific data in the memory of the hands-free device is deleted.

If the user moves away from the hands-free device again with his mobile phone device, for example if he leaves the vehicle, the mobile phone device moves outside the interfaces and the Bluetooth connection is interrupted. The hands-free device then signs off automatically from the mobile phone network and the mobile phone device "wakes up" and signs on automatically again onto the mobile phone network if it was signed on at the time when the signing on of the hands-free system took place.

SUMMARY OF THE INVENTION

It is accordingly an object of the invention to provide a mobile phone configuration for a motor vehicle which overcomes the above-mentioned disadvantages of the heretofore-known devices and methods of this general type and which further improves the possible uses of such a motor-vehicle mobile phone configuration, a method for mobile phone communication and a mobile phone terminal which is suitable for this purpose.

With the foregoing and other objects in view there is provided, in accordance with the invention, a motor-vehicle mobile phone configuration, comprising:

a vehicle-mounted terminal permanently installed in a vehicle and connected to a mobile phone module with an antenna and a first Bluetooth module;

a mobile phone terminal having a subscriber identity module (SIM) and a second Bluetooth module configured to set up between said vehicle-mounted terminal and said mobile phone terminal a Bluetooth connection for transmitting SIM data to said vehicle-mounted terminal and signing on to a mobile phone network using the SIM data;

said mobile phone terminal operating as a handset for said vehicle-mounted terminal, wherein useful data is exchanged via said first and second Bluetooth modules.

With the above and other objects in view there is also provided, in accordance with the invention, a method for mobile phone communication in a motor vehicle, which comprises:

providing a motor-vehicle mobile phone configuration having:
  a vehicle-mounted terminal permanently installed in the motor vehicle, the vehicle-mounted terminal including a mobile phone module connected to an antenna and a Bluetooth module; and
  a mobile phone terminal having a subscriber identity module (SIM) and a Bluetooth module;

setting up a Bluetooth connection between the vehicle-mounted terminal and the mobile phone terminal and transmitting SIM data from the SIM to the vehicle-mounted terminal;

signing on to a mobile phone network, with the vehicle-mounted terminal using the SIM data;

exchanging useful data between the Bluetooth module of the vehicle-mounted terminal and the Bluetooth module of the mobile phone terminal, and thereby operating the mobile phone terminal as a handset of the vehicle-mounted terminal.

With the above and other objects in view there is also provided, in accordance with the invention, a mobile phone terminal, comprising:

a subscriber identity module (SIM) containing SIM data;

a Bluetooth module connected to said SIM for transmitting the SIM data to another terminal via a Bluetooth connection;

a switch configured to switch the mobile phone terminal as a handset, and to configure said Bluetooth module to transmit useful data in addition to the SIM data via the Bluetooth connection.

In other words, the mobile phone terminal operates as a handset of the permanently installed terminal, with the useful data being exchanged via the Bluetooth module. The mobile phone terminal operates therefore in parallel as a SIM card reader and as a handset. Mobile phone communication use is possible from the motor vehicle without the presence of the elements of the hands-free device such as a microphone or loudspeaker. Furthermore, it is thus possible to make calls which are not listened in to by all the other vehicle occupants.

The mobile phone module is preferably embodied as a GSM module.

In a further preferred embodiment, the permanently installed terminal is embodied as a hands-free device which is connected to at least one loudspeaker and to a microphone, wherein case the hands-free device or the handset can be selected by means of at least one operator control element on the permanently installed terminal and/or on the mobile phone terminal. This therefore permits the user either to use the mobile phone terminal as a handset or as a pure SIM card reader so that the user can utilize the advantages of the respective operating mode according to the situation.

Other features which are considered as characteristic for the invention are set forth in the appended claims.

Although the invention is illustrated and described herein as embodied in a motor vehicle mobile phone configuration, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawing.

BRIEF DESCRIPTION OF THE DRAWING

The sole FIGURE shows a schematic block circuit diagram of a motor-vehicle mobile phone configuration according to the invention.

DESCRIPTION OF THE PREFERRED EMBODIMENT

Figure 1:
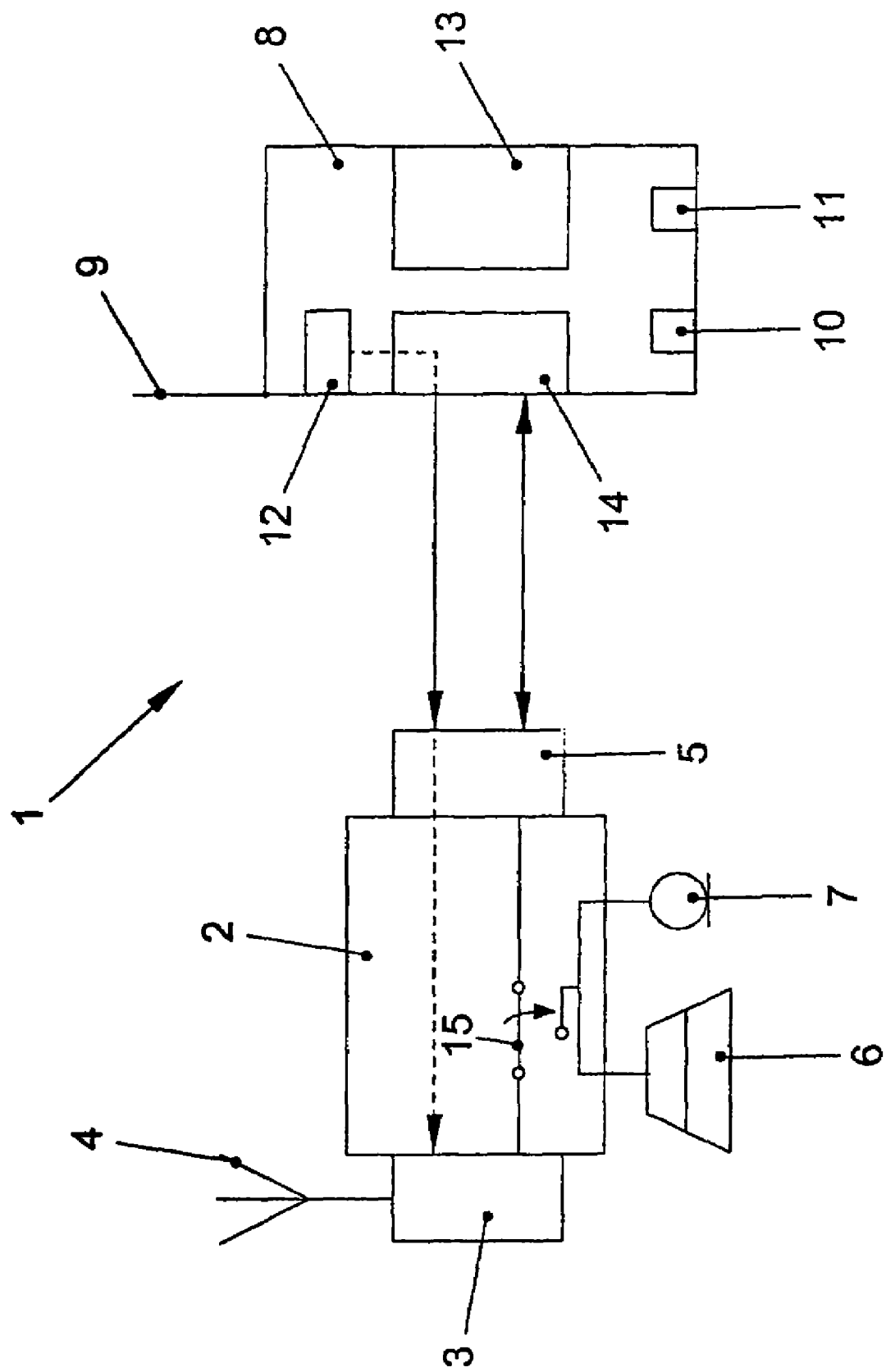

Referring now to the FIGURE of the drawing in detail, the motor-vehicle mobile phone configuration 1 comprises a vehicle-mounted terminal 2 that is permanently installed in the vehicle and is embodied as a hands-free device. The terminal 2 is connected to, or has, a mobile phone module which is embodied as a GSM module 3 and has an antenna 4. Furthermore, the vehicle-mounted terminal 2 is connected to a Bluetooth module 5, a loudspeaker 6, and a microphone 7. The motor-vehicle mobile phone configuration 1 also has a mobile phone terminal 8 which is embodied with an antenna 9, a microphone 10, a loudspeaker 11, a SIM 12, a keyboard 13, and a Bluetooth module 14.

A switch element 15, which may be embodied here either as hardware or software is disposed in the terminal 2. Two operating modes can be implemented by way of the motor-vehicle mobile phone configuration 1. Alternatively, the switch element 15 may be provided in the mobile phone terminal 8, or in both terminals 2 and 8.

In a first operating mode, the mobile phone terminal 8 operates purely as a SIM card reader, as is known from the prior art. For this purpose, the mobile phone terminal 8 transmits its SIM data to the terminal 2 via the Bluetooth module 14, the Bluetooth connection being maintained permanently. The telecommunications useful data, generally audio data, is, in contrast, output via the loudspeaker 6 and input via the microphone 7. For that purpose, the switch element 15 connects the GSM module 3 to the loudspeaker 6 and the microphone 7. In terms of the further details relating to signing on to the telecommunications network and signing off from it, as well as the Bluetooth communication, reference is had expressly to German published patent application DE 101 00 824 A1, which is incorporated by reference herein.

In a second operating mode, the mobile phone terminal 8 may operate as a handset of the terminal 2. A precondition for the second operating mode is that the terminal 2 has signed on to the mobile phone network. Switching over between the two operating modes is carried out here, for example, by means of a special input to the mobile phone terminal 8, for example by means of the keypad input unit 13 and/or by means of an input element on the terminal 2. As in the first operating mode, there is a permanent SIM data connection between the Bluetooth module 14 and the Bluetooth module 5. The signing on process with the network operator is also the same. In contrast to the first operating mode, the switch element 15 switches the GSM module 3 to the Bluetooth module 5. The useful data which is received by the GSM module 3 is then transmitted from the Bluetooth module 5 to the Bluetooth module 14 and from there output to the loudspeaker 11. Similarly, the useful data which is received by the microphone 10 and input at the keypad 13 is transmitted via the Bluetooth module 14 to the Bluetooth module 5 and from there transmitted via the switch element 15 to the GSM module 3.

Automatic switching of the mobile phone terminal 8 as a handset is also possible. After the SIM data has been transmitted and the signing on process with the network operator is finished the mobile phone terminal 8 switches automatically into the operating mode of the handset and is available for private calls in the vehicle.

We claim:

1. A motor-vehicle mobile phone configuration, comprising:

a vehicle-mounted terminal permanently installed in a vehicle and connected to a mobile phone module with an antenna and a first Bluetooth module;

a mobile phone terminal having a subscriber identity module (SIM) and a second Bluetooth module configured to set up between said vehicle-mounted terminal and said mobile phone terminal a Bluetooth connection for transmitting SIM data to said vehicle-mounted terminal and signing on to a mobile phone network using the SIM data;

said mobile phone terminal operating as a handset for said vehicle-mounted terminal, enabling a user to communicate via a microphone of said mobile phone terminal and through said vehicle-mounted terminal, wherein useful data is exchanged via said first and second Bluetooth modules.

2. The motor-vehicle mobile phone configuration according to claim 1, wherein the mobile phone module is a GSM module.

3. The motor-vehicle mobile phone configuration according to claim 1, wherein said vehicle-mounted terminal is a hands-free device connected to at least one loudspeaker and to a microphone, and the configuration further comprises at least one operator control element disposed on said vehicle-mounted terminal and/or on said mobile phone terminal and configured to enable a user to select said hands-free device or said handset for communication.

4. A method for mobile phone communication in a motor vehicle, which comprises:

providing a motor-vehicle mobile phone configuration having:

a vehicle-mounted terminal permanently installed in the motor vehicle, the vehicle-mounted terminal including a mobile phone module connected to an antenna and a Bluetooth module; and a mobile phone terminal having a subscriber identity module (SIM) and a Bluetooth module;

setting up a Bluetooth connection between the vehicle-mounted terminal and the mobile phone terminal and transmitting SIM data from the SIM to the vehicle-mounted terminal;

signing on to a mobile phone network, with the vehicle-mounted terminal using the SIM data;

exchanging useful data between the Bluetooth module of the vehicle-mounted terminal and the Bluetooth module of the mobile phone terminal, and thereby operating the mobile phone terminal as a handset of the vehicle-mounted terminal, enabling a user to communicate via a microphone of said mobile phone terminal and through said vehicle-mounted terminal; and enabling a user to selectively communicate directly via the vehicle-mounted terminal or via the mobile phone terminal as a handset of the vehicle-mounted terminal.

5. A motor-vehicle mobile phone configuration, comprising:

a vehicle-mounted terminal permanently installed in a vehicle and connected to a mobile phone module with an antenna and a first Bluetooth module;

a mobile phone terminal having a microphone, a subscriber identity module (SIM), and a second Bluetooth module configured to establish between said vehicle-mounted terminal and said mobile phone terminal a Bluetooth connection for transmitting SIM data to said vehicle-mounted terminal and signing on to a mobile phone network using the SIM data;

said mobile phone terminal operating as a handset for said vehicle-mounted terminal, enabling a user to communicate via said microphone of said mobile phone terminal and through said vehicle-mounted terminal, wherein useful data is exchanged via said first and second Bluetooth modules.

6. The motor-vehicle mobile phone configuration according to claim 5, wherein said vehicle-mounted terminal is a hands-free device connected to at least one loudspeaker and to a microphone, enabling the user to communicate via said vehicle-mounted terminal when said mobile phone terminal is not being used as a handset for said vehicle mounted terminal.

* * * * *